I. E. PALMER,

Assignor, by mesne assignments, to himself and V. S. ALLIEN.

Coil Holder for Wire, &c.

No. 9,605. Reissued March 15, 1881.

Witnesses
John Becker
Jas K Haynes

Inventor
Isaac E. Palmer
by his Attorneys
Brown & Brown

UNITED STATES PATENT OFFICE.

ISAAC E. PALMER, OF MIDDLETOWN, CONNECTICUT, ASSIGNOR, BY MESNE ASSIGNMENTS, TO HIMSELF AND VICTOR S. ALLIEN, OF NEW YORK, N. Y.

COIL-HOLDER FOR WIRE, &c.

SPECIFICATION forming part of Reissued Letters Patent No. 9,605, dated March 15, 1881.

Original No. 143,376, dated September 30, 1873. Application for reissue filed April 24, 1879.

*To all whom it may concern:*

Be it known that I, ISAAC E. PALMER, formerly of Hackensack, in the county of Bergen and State of New Jersey, but now of Middletown, in the county of Middlesex and State of Connecticut, have invented a new and useful Coil-Holder for Wire or other Stiff Cord, of which the following is a specification.

The invention consists in a novel construction of holder for wire or other cord put up in coil, with facility for said material being unwound and drawn or measured out from the center of the holder without any liability of entanglement by the helices of the coil turning over or dropping in the center, and preferably with facility for the adjustment of sections, heads, or disks in relation to each other to suit coils of different widths.

Figure 1:
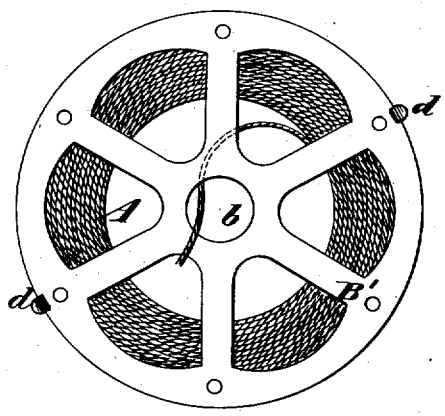
Figure 2:
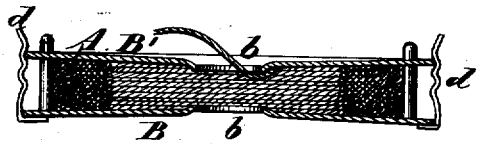

In the accompanying drawings, which form part of this specification, Figure 1 represents a face view, and Fig. 2 a central transverse section, of my newly-invented coil-holder with a coil of wire cord therein, and as being drawn out from the center thereof.

Similar letters of reference indicate corresponding parts.

This holder, which is of circular form, or otherwise constructed to receive and support or hold within it a coil, A, of wire cord, is composed of two sections, heads, or disks, B B′, arranged at a suitable distance apart, according to the depth or thickness of the coil, and which are preferably adjustable in relation with each other to suit different thicknesses of coil, and to provide for a close hold of the latter as the same is reduced by being drawn out through a central eye, *b*, in either disk. To this end the one coil-holder section or disk may be fitted to be movable along guides carried by the other section, and, when adjusted, be held by notched spring-catches *d d* or otherwise. Such means also afford every facility, on removal of the one section, head, or disk, for entering the coil within the holder. Either disk B B′ is shown as made inclining, or with a dip toward its center for the purpose of more perfectly holding the loose cord and preventing the coils from turning over or becoming entangled when drawing or measuring out the wire through the open central eye, *b*, of the disk. A coil-holder thus constructed gives the same facility for measuring off wire or stiff cord incapable of being balled as is afforded by holders of twine, which latter, being balled, holds itself in the order it has been wound while being drawn or measured out from the center of its holder, and consequently is not as liable to become entangled as a loose coil of wire or stiff cord, which is apt to turn over and drop in the center, so that it is difficult to measure off wire or stiff cord from a coil; but by means of a coil-holder as herein described this difficulty is entirely overcome, because the holder hugs the coil closely, preserving the relation of its helices, keeping them from spreading or separating. It will thus be seen that there is a combination or coaction of the coil and its holder not existing between a ball of ordinary cord or twine and its holder.

What is here claimed, and desired to be secured by Letters Patent, is—

1. As an article of commerce, a coil of wire inclosed within a box or case which closely fits and holds the outer coils from unwinding, and permits the wire to be delivered from the center of the coil through an eye in the box or case.

2. A coil-holder composed of sections, heads, or disks constructed and arranged to support and hold the coil in between them, and provided with a central eye, substantially as and for the purposes herein set forth.

3. A coil-holder having its sections, heads, or disks adjustable in relation with each other, essentially as herein set forth.

I. E. PALMER.

Witnesses:

HENRY T. BROWN,

T. J. KEANE.